M. H. McCHESNEY.
Key-Board for Pianos and Organs.

No. 197,648. Patented Nov. 27, 1877.

UNITED STATES PATENT OFFICE.

MARTIN H. McCHESNEY, OF JACKSON, MICHIGAN, ASSIGNOR TO HIMSELF AND MOSES K. BORTREE, OF SAME PLACE.

IMPROVEMENT IN KEY-BOARDS FOR PIANOS AND ORGANS.

Specification forming part of Letters Patent No. 197,648, dated November 27, 1877; application filed August 13, 1877.

*To all whom it may concern:*

Be it known that I, MARTIN H. MCCHESNEY, of Jackson, in the county of Jackson and State of Michigan, have invented an Improvement in Key-Boards, of which the following is a specification:

With the key-board of the piano and organ arranged in the usual way, musicians frequently encounter passages which are difficult, if not impossible, to finger correctly, owing to the shortness of the thumb.

The object of my invention is to enable the player to "thumb" any black key without being compelled to cramp or distort his hand out of a natural position; and to this end it consists in extending the so-called "black keys" to the front of and below the keys of the key-board proper, terminating in full-width playing-surfaces in the natural position to be struck by the thumbs when the fingers are on the "natural" keys.

Figure 1:
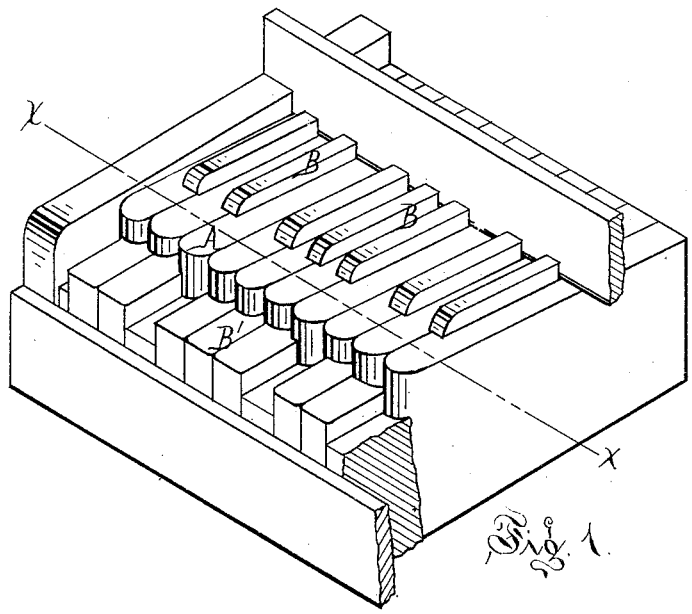
Figure 2:
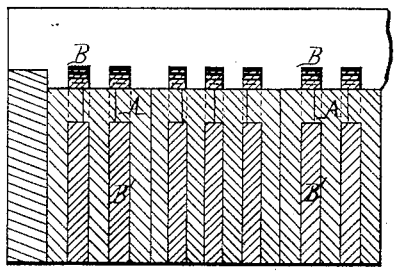

Figure 1 is a sectional perspective view. Fig. 2 is a transverse section at $x\ x$.

In the drawing, A represents the row of so-called "natural" keys, and B the groups of so-called "flat" and "sharp" keys, arranged in the usual manner.

The shafts of the keys B are extended to the front of the keys A, passing under and between them, terminating in raised keys B', but on a lower plane than the keys A, occupying, however, the same relative positions as the keys B in the chromatic scale.

I am aware of the patent granted August 7, 1860, to C. J. Schoenemann, and hereby disclaim the same; but

What I claim as my invention is—

In a key-board the keys of which are arranged and grouped in the usual manner, the extension of the shafts of the flat and sharp keys to the front of the natural keys, each of said extended shafts carrying a full-sized playing surface or key, substantially as represented and set forth.

MARTIN H. McCHESNEY.

Witnesses:
H. F. EBERTS,
H. L. AULLS.